United States Patent Office 2,755,182
Patented July 17, 1956

2,755,182
COPPER-BASE BRAZING ALLOY

Arthur T. Cape, Los Angeles, Calif., assignor to Superweld Corporation, North Hollywood, Calif., a corporation of California No Drawing. Application July 29, 1955,
Serial No. 525,371

2 Claims. (Cl. 75—159)

This invention relates generally to alloys, but has reference more particularly to a copper-base alloy which is especially adapted for use in copper brazing, for joining metals.

A primary object of the invention is to provide an alloy of the character described, which has exceptional flow characteristics.

Another object of the invention is to provide an alloy of the character described, which, when used in copper brazing, produces a joint strength which is substantially greater than joint strengths produced by the use of copper alone.

Other objects and advantages of the invention will become apparent in the course of the following description.

An alloy, in accordance with the invention, is made as a ternary alloy, in which the basic constituent is copper, but in order to obtain the exceptional flow characteristics and increased joint strengths to which reference has been made, I alloy with the copper certain elements, in critical proportions, namely, nickel and boron.

More specifically, the alloy will contain the following constituents, in the proportions stated:

|  | Range, percent | Preferred Alloy, percent |
|---|---|---|
| Copper | 80–99.5 | 94 |
| Nickel | 0.5–17 | 5 |
| Boron | 0.8–3.5 | 1 |
|  |  | 100 |

The alloy has been found to be particularly valuable in the copper brazing of parts, especially where it is desired that the joint between the parts have high strength, and where excellent flow characteristics are a desideratum.

It is to be understood that certain other elements may be present in the alloy in trace amounts or as impurities, but the amounts of such elements which may be present are virtually negligible for the purposes of the invention.

It is to be understood that various changes may be made in the proportions of the ingredients of the alloy without departing from the spirit of the invention or the scope of the subjoined claims.

Having thus described my invention, I claim:

1. A copper-base brazing alloy having high joint strength and excellent flow characteristics, said alloy consisting of from about 80% to about 99.5% copper, about 0.5% to about 17% nickel, and about 0.8% to about 3.5% boron.

2. A copper-base brazing alloy having high joint strength and excellent flow characteristics, said alloy consisting of about 94% copper, about 5% nickel, and about 1% boron.

No references cited.